United States Patent [19]
Yuzuriha et al.

[11] Patent Number: 5,603,299
[45] Date of Patent: Feb. 18, 1997

[54] INTAKE PORT STRUCTURE AND METHOD OF DETERMINING DETAILS THEREOF

[75] Inventors: Yasuhiro Yuzuriha; Manabu Shibakawa, both of Hiroshima, Japan

[73] Assignee: Mazda Motor Corporation, Hiroshima-ken, Japan

[21] Appl. No.: 489,507

[22] Filed: Jun. 12, 1995

[30] Foreign Application Priority Data

Jun. 10, 1994 [JP] Japan .................................. 6-152857

[51] Int. Cl.⁶ .................................................. F02B 31/00
[52] U.S. Cl. .......................................... 123/308; 123/432
[58] Field of Search .................................. 123/306, 308, 123/432, 430

[56] References Cited

U.S. PATENT DOCUMENTS 4,622,940 11/1986 Yoshikawa .................... 123/188.14
5,050,566 9/1991 Distelrath et al. .................... 123/432
5,138,988 8/1992 Distelrath et al. .................... 123/308
5,245,964 9/1993 Matsuo et al. ......................... 123/306
5,394,845 3/1995 Noh et al. .......................... 123/188.14

FOREIGN PATENT DOCUMENTS

4-137224 12/1992 Japan .
5-340258 12/1993 Japan .

Primary Examiner—David A. Okonsky
Attorney, Agent, or Firm—Keck, Mahin & Cate

[57] ABSTRACT

An intake port of an engine cylinder is directed so as to introduce intake air flow into a combustion chamber in a desired direction. The intake port has a throat portion, extending upstream from a valve port and configured so as to meet the valve port at a given angle, and a transitional throat portion with a small radius of curvature between the throat portion and the valve port.

19 Claims, 4 Drawing Sheets

| PORT No. | PORT TYPE | ΔSRi / δ | L / D |
|---|---|---|---|
| 1 | TANGENTIAL | 11 % | 0.6 |
| 2 | ↑ | 5 % | 1.2 |
| 3 | ↑ | 3 % | 1.0 |
| 4 | HELICAL | 1 % | — |

ΔSRi = [SRi(Base) − SRi(Deviation)] / SRi(Base) × 100
δ : CORE DEVIATION
L : STRAIGHT THROAT LENGTH

FIG. 6C

INTAKE PORT STRUCTURE AND METHOD OF DETERMINING DETAILS THEREOF

BACKGROUND OF THE INVENTION

1. Field of the Invention

The present invention relates to an intake port structure for a cylinder head of an engine and a method of determining the intake port structure.

2. Description of Related Art

Much attention has been given to various fluid mechanical approaches relating to techniques for determining configurations of intake ports and, in particular, the configurations of portions of the ports in close proximity to valve seats. Such configurations are one of the most important and decisive factors governing the flow pattern of intake air in cylinders. Typically, such an intake port configuration is designed and specified with regard to the center line and upper and lower profiles of an open end of the intake port only and finished, in actual fact, through trial and error. Various efforts have been made to configure the intake port in order to produce a swirl in a plane perpendicular to the axis of the cylinder and a vertical "tumble" in a plane parallel to the axis in a combustion chamber. One such effort is that described in Japanese Unexamined Utility Model Publication No. 4-137224. In order for the intake port to produce an enhanced tumble, the intake port is made, according to this publication, so as to be directed to and meet the outlet opening into the combustion chamber at a small angle (hereafter referred to as a directional angle). The intake port is further made to have an approximately straight center line intersecting the axis of an intake valve and a cross-section which is enlarged toward a location at which a tumble is produced. Another effort, described in Japanese Unexamined Patent Publication No. 5-340258, involved providing two intake ports, namely a primary intake port, which meets an outlet end opening into the combustion chamber at a small directional angle, and a secondary intake port, which meets the combustion chamber at a large directional angle and is selectively used according to engine operating conditions.

An intake port which meets the combustion chamber at a small directional angle, relative to a plane along which an outlet end opens into the combustion chamber, is advantageous in that it enhances a swirl in the combustion chamber. Nevertheless, intake air flow forced toward a tangential direction of the cylinder is deflected toward the center axis of the cylinder due to a curved transitional portion between the major portion of the intake port and the outlet end or valve port. This deflection leads to aggravation of a swirl. If the intake port does not have such a curved transitional portion and is straight and intersects the center axis of the cylinder, it is, practically, difficult to provide for an adjoining portion, between the straight portion of the intake port and the valve port, a cross-sectional configuration having a resistance which is sufficiently low for intake air to flow smoothly. Further, it is typical, in designing an intake port, to define a center line and inlet and outlet ends of the intake port only. Because details of the intake port configurations are not specified, it is impossible to simulate and analyze flow patterns of intake air. Consequently, the hydromechanical study of such an intake port takes a lot of time and it is difficult to improve the configuration of the proposed intake port in a short period.

SUMMARY OF THE INVENTION

It is an object of the present invention to provide an intake port structure for a cylinder head of an engine which has no increase in resistance to the flow of intake air at a transitional throat portion and enables, independently of the transitional throat portion, determination of a center line so as to direct intake air flow in a desired direction.

It is another object to provide a method of establishing the configuration of an intake port for a cylinder head of an engine so that the intake port has no increase in resistance to the flow of intake air at a transitional throat portion and enables, independently of the transitional throat portion, determination of a center line so as to direct intake air flow in a desired direction.

The present invention has been made according to experimental knowledge proving that, for an intake port which has a center line directed at an increased directional angle so as to produce an enhanced swirl, it is essential for the intake port to have a transitional throat curving with a radius of curvature sufficiently small so as to prevent intake air flow from being deflected toward the vertical center line of the cylinder. Under such conditions, when a reference plane for defining a cross-sectional configuration and area therein is gradually shifted between an upper reference plane, perpendicular to the center line of the intake port, and a bottom reference plane, perpendicular to the center line of a valve port, over a length of the intake port necessary for the intake port to provide the directivity of intake air flow, the intake port is prevented from increasing resistance to intake air flow due to changes in a cross-sectional area at the curved transitional portion. If the cross-sectional areas of the intake port in these reference planes are substantially the same and the cross-sectional area in a plane perpendicular to the center line of the intake port gradually narrows toward the valve port, then the intake port enables intake air to flow into the combustion chamber at an increased speed, producing an enhanced and stronger swirl.

The above objects of the present invention are achieved by providing an intake port structure for a cylinder head in which an intake port is directed so as to introduce intake air flow into a combustion chamber in a desired direction through a valve port at an end thereof. The intake port includes a throat portion, extending upstream from the valve port. A line, tangential to a center line of the throat portion at an intersection point between an extension of the center line of the throat portion and a center line of the valve port perpendicular to a plane in which the valve port opens into the combustion chamber, intersects the plane at a given angle. The intake port has approximately the same cross-sectional area in reference planes gradually shifting between an upper reference plane, perpendicular to the center line of the throat portion at a given distance from the intersection point, and a bottom reference plane, perpendicular to the center line of the valve port at the intersection point. The intake port may include a transitional throat portion having a center of curvature within the intake port, provided in close proximity to the intersection point, which curves with a radius sufficiently small so as to have no effect on directivity of intake air flow.

When the cylinder head has at least two intake ports, one of them is configured so as to produce a swirl in a plane perpendicular to the vertical center line of the cylinder. The other is configured so as to produce a tumble in a plane approximately parallel to the vertical center line of the cylinder. The one intake port includes a throat portion, extending upstream from the valve port, and a transitional throat portion, extending between the throat portion and the valve port, which curves with a radius sufficiently small so as to have no effect on directivity of intake air flow. The throat portion is configured so that a line, tangential to a center line of the throat portion at an intersection point between an extension of the center line of the throat portion and a center line of the valve port perpendicular to a plane in which the valve port opens into the combustion chamber, intersects the plane at a given angle. The throat portion is further configured so as to have approximately the same area of cross-sections in reference planes which are gradually shifted between an upper reference plane, perpendicular to the center line of the throat portion at a given distance from the intersection point, and a bottom reference plane, perpendicular to the center line of the valve port at the intersection point.

The intake port may have an internal wall, adjacent to the valve port and cut coaxially with the center line of the valve port by use of a cutting tool, having an upper edge chamfered and rounded with a predetermined curvature to a height so as to form a rounded concave shoulder along a predetermined circumferential extent. The rounded shoulder may be formed on one side at which the intake port produces a swirl in the combustion chamber with respect to the center line of the valve port. A predetermined finishing allowance necessary to leave an edge along a predetermined circumferential extent on another side, opposite to the one side with respect to the center line of the valve port, is removed.

It is preferred to provide the throat portion with a circular cross-section in each reference plane and to have the center line curved with a radius of curvature more than three times as long as a diameter of the circular cross-section. It is also preferred for the transitional throat portion to have a radius of curvature which is less than half the diameter of the circular cross-section.

Before final finishing, it is preferable to provide the throat portion with an internal wall which gradually narrows downstream starting from a specific point above a plane in which a center of curvature of the transitional throat portion is positioned and which is perpendicular to the center line of the valve port and below a transitional point from the transitional throat portion to the throat portion.

The intake port structure according to the present invention permits intake air to flow into the combustion chamber at an increased speed and produces an enhanced or strong swirl. In addition, the distribution of flow speeds at which intake air flows into a combustion chamber is unconditionally controlled by adjusting the directional angles of intake ports. Because the outlet ends of the intake port and the valve port are precisely coaxial with each other, intake air flows smoothly into the combustion chamber and is uniform among intake ports.

The throat, thus structured, has a sufficient length to rectify intake air flow and assure directivity of intake air flow. The transitional throat, according to the present invention, makes it easy to machine and finish the entire internal wall of the end thereof and has no effect on the directivity of intake air flow.

BRIEF DESCRIPTION OF THE DRAWINGS

The above and other objects and features of the present invention will be clearly understood from the following description of a preferred embodiment thereof when considered in conjunction with the accompanying drawings, in which.

DESCRIPTION OF THE PREFERRED EMBODIMENT

Figure 1:
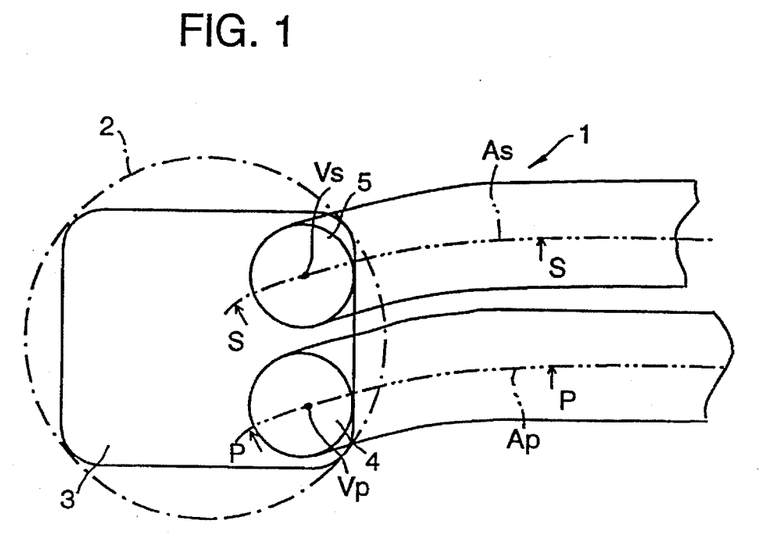
FIG. 1 is a schematic cross-sectional view showing an arrangement of intake ports of a cylinder head.
Figure 2:
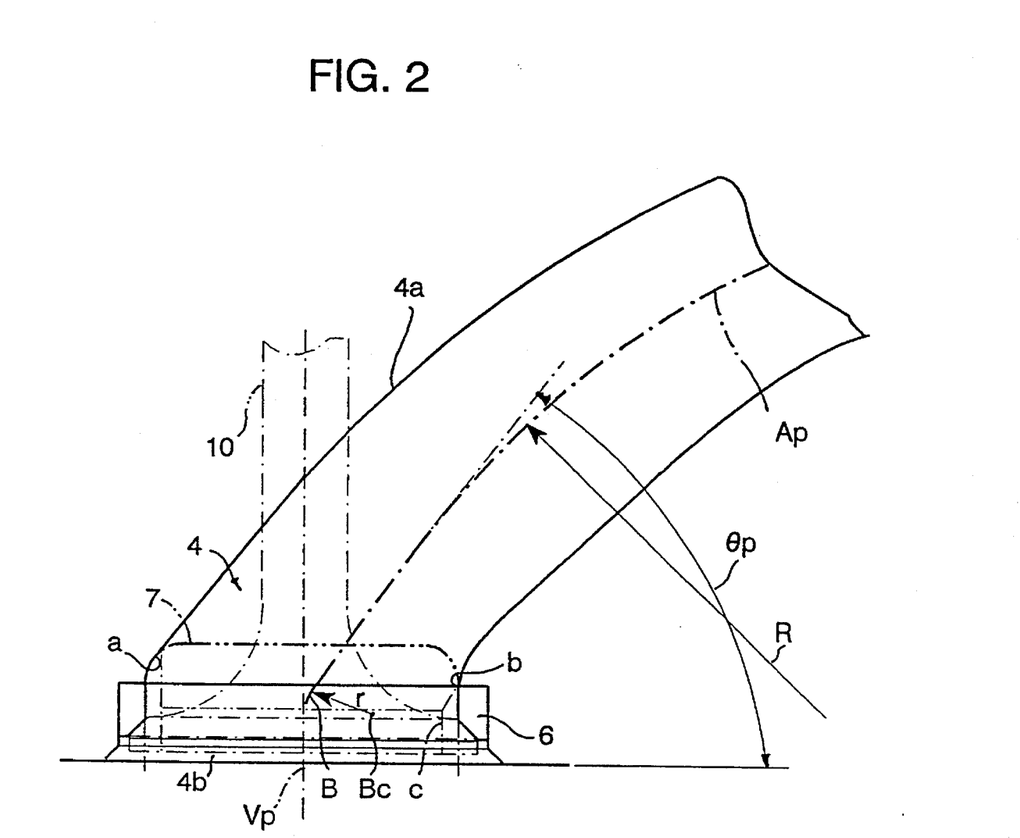
FIG. 2 is a vertical-sectional view of the intake port along a center line as viewed along line P—P of FIG. 1.
Figure 3:
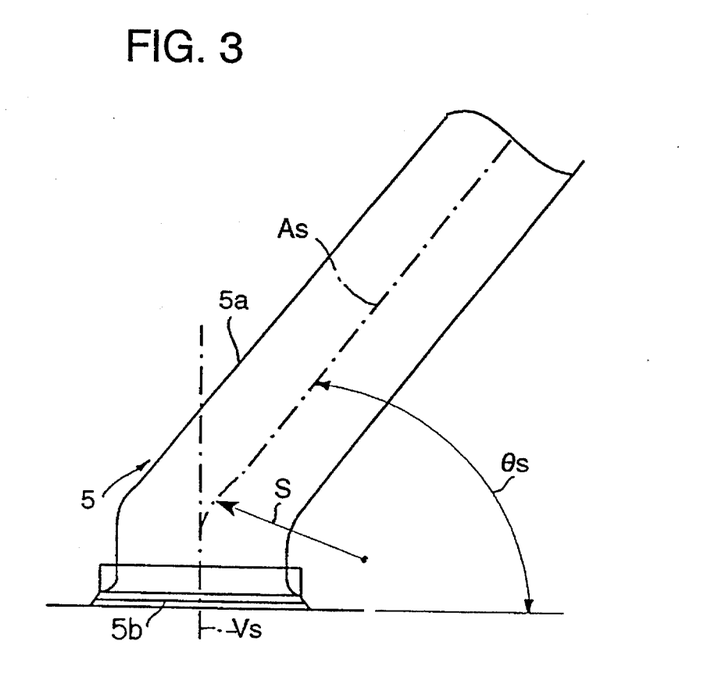
FIG. 3 is a vertical-sectional view of the intake port along a center line as viewed along line S—S of FIG. 1.

Referring now to the drawings in detail and, in particular, to FIGS. 1 to 3, an arrangement of intake ports of a cylinder head for a four-cycle diesel engine is illustrated. The cylinder head 1 is formed with primary and secondary intake ports 4 and 5 and a cavity 3 which forms a combustion chamber cooperating with a cylinder bore 2 of a cylinder block (not shown). These primary and secondary intake ports 4 and 5 open into valve ports 4b and 5b, respectively, which are arranged, side by side, on one side of a horizontal center line of the combustion chamber. The cylinder head 1 is further formed with two exhaust ports (not shown) opening into valve ports, respectively, which are arranged side by side on another side of the horizontal center line of the combustion chamber. The primary intake port 4 has a generally straight throat portion 4a extending from the valve port 4b over a certain length. The throat portion 4a is configured so that a center line is directed in a tangential direction with respect to the cylinder bore 2 so as to produce a lateral swirl in the cylinder bore 2. The secondary port 5 has a generally straight throat portion 5a extending from the valve port 5b along a certain length. The throat portion 5a is configured so that a center line is directed so as to produce a vertical tumble. Each of these generally straight throat portions 4a and 5a has a length sufficient to provide directivity to the intake air flow. Specifically, as is clearly shown in FIG. 2, the generally straight throat portion 4a includes a transitional throat section B curving with a small radius of curvature r between a major upstream straight throat section and a downstream straight throat section. These throat sections are defined by a continuum of substantially circular cross-sections with centers on a line (referred to as a center line) AP extending initially straight, transitionally curving with a radius of curvature of r, and terminating straight and tangentially to the axis VP of an intake valve 10. The generally straight throat portion 4a is directed so that the extension of the center line section AP of the major upstream straight throat section intersects a plane, in which the valve port 4b opens into the combustion chamber, perpendicular to the axis VP of the intake valve 10 at a directional angle θP of, for instance, 50° which is relatively small. The generally straight throat portion 4a continues to an upstream intake port via a transitional intake port section curving with a radius of curvature of R. The generally straight throat portion 4a may have a curved throat section in place of the major upstream straight throat section. In such a case, the curvature of center line section AP is more than three times as large as a diameter of a circular cross-sectional area of the curved throat portion 4a as viewed in a reference plane. In this instance, the reference plane, in which a cross-sectional configuration and area of the throat portion 4a are defined, refers to a plane perpendicular to the center line AP at a distance from the plane at which the throat portion 4a opens into the valve port 4b between the upstream extremity of the throat portion 4a and the downstream extremity of the throat portion 4a. The throat portion 4a is configured so as to have the same cross-sectional area in any reference plane.

The generally straight throat portion 4a may have a major curved upstream throat section having a center line section AP which curves at a curvature of, for example, 100 mm in place of the major upstream straight throat section. In this event, the directional angle θP of the generally straight throat portion 4a refers to an angle defined between a line passing an intersection of the extension of the curved center line AP of the curved upstream throat section and the axis VP of the intake valve 10 and tangential to the curved center line AP of the curved upstream throat section and the plane in which the valve port 4b opens into the combustion chamber.

For example, letting the curved transitional throat section B be a cross-sectional area with an internal diameter of 27 mm in a plane perpendicular to the axis VP of the intake valve 10, the center line section AP has a curvature r of approximately 7.5 mm and has its center Bc of curvature within the valve port 4b. In this case, the transitional intake port section, continuous with the generally straight throat portion 4a, curves at a curvature R of approximately 45 mm.

Similarly, as is clearly shown in FIG. 3, the generally straight throat portion 5a has a center line As which is initially straight, transitionally curves with a curvature S larger than the curvature r, and terminates so as to be tangential to the axis Vs of an intake valve (not shown) in close proximity to a valve port 5b. In this instance, the curvature S is, for instance, 16 mm. The generally straight throat portion 5a is directed so that the extension of the center line section As of the major upstream straight throat section intersects a plane, in which the valve port 5b opens into the combustion chamber, perpendicular to the axis Vs of the intake valve at a directional angle θs which is larger than the directional angle ηP for the generally straight throat portion 4a.

When the engine is operating under a low load, the secondary intake port 5 is closed so as to enhance a swirl produced by the primary intake port 4. On the other hand, when the engine is operating under high load, both primary and secondary intake ports 4 and 5 are opened so as to charge an increased amount of a fuel mixture into the engine.

With the intake port structure thus configured, because the primary intake port 4 is directed and opens into the combustion chamber at a relatively small directional angle θP, it increases a vector of principle intake air flow in a forward direction so as to enhance a swirl. Further, because the generally straight throat portion 4a has the transitional throat section B which is curved with a small radius r, it forms a smooth continuous path to the valve port 4b for intake air flow and prevents the principle intake air flow from shifting in direction toward the axis VP of the intake valve 10. This keeps the vector of principle intake air flow enhanced in a forward direction due to a great inclination of the center line AP of the generally straight throat portion 4a relative to the axis VP of the intake valve 10. This, in turn, leads to an efficient swirl production.

Because the reference plane, in which a cross-sectional configuration and area of the throat portion 4a is defined, is perpendicular to the center line AP at any distance along the entire length of the generally straight throat portion 4a from the upstream extremity of the throat portion 4a to the downstream extremity of the throat portion 4a, the change in the cross-sectional configuration of the transitional throat section B, curved with a small curvature r, does not increase resistance to intake air flow. In addition, because the throat portion 4 has approximately the same cross-sectional area in any reference plane, the throat portion 4a gradually narrows. This increases the speed of intake air flow, enhancing a swirl.

When machining the cylinder head of the present invention, if a cylinder head 1 has no circumferential finishing allowance along a part of the valve opening 4b after having preliminarily finished the internal wall of the intake port 4, which may occur due to deviation of a core while casting the cylinder head, then the cylinder head 1 will be formed with a step between the open end of the intake port 4 and the valve seat 6. Such a step has an adverse effect on intake air flow in the intake port 4. In order to prevent the formation of a step, the valve port 4b and the open end of the intake port 4 are finished simultaneously, and coaxially with the axis VP of the intake valve 10, by use of a cutting tool 7 so as to provide an upper edge which is chamfered and rounded with a certain curvature. Specifically, the cutting tool 7 cuts the internal wall of the intake port 4 to a height so as to both (1) form a rounded concave shoulder a along a certain circumferential extent of the intake port 4a adjacent to the valve port 4b on one side where a swirl is produced in the combustion chamber (referred to as a swirl side for simplicity) with respect to the center line AP of the intake port 4 and (2) leave an edge b along a certain circumferential extent of the valve port 4b on another side opposite to the swirl side with respect to the center line AP of the intake port 4. It is advantageous to provide the transitional throat section B, curved with a small curvature r, in close proximity to the intersection of the center line AP of the intake port 4 and the axis VP of the intake valve 10. This permits leaving, to a preliminarily finished cylinder head 1, a finishing allowance which extends along the entire internal circumference of the valve port at the end of the intake port 4 and is offset on the swirl side with respect to the axis VP of the intake valve 10.

Further, in order to both leave, to the primary intake port 4, a circumferential finishing allowance and make it easy to insert and fix a core from the side of the cavity, the throat portion 4a is configured so as to have an internal wall which gets gradually narrower downstream, starting from a specific point, for finishing. The narrowest opening of the throat portion 4a before finishing is indicated by a mark c. The specific point is above a plane in which the center Bc of curvature of the transitional throat section B is positioned and which is perpendicular to the axis VP of the intake valve 10. The specific point is also below a transitional point from the curved transitional throat section B to the major upstream straight throat section of the throat portion 4a.

Figure 4:
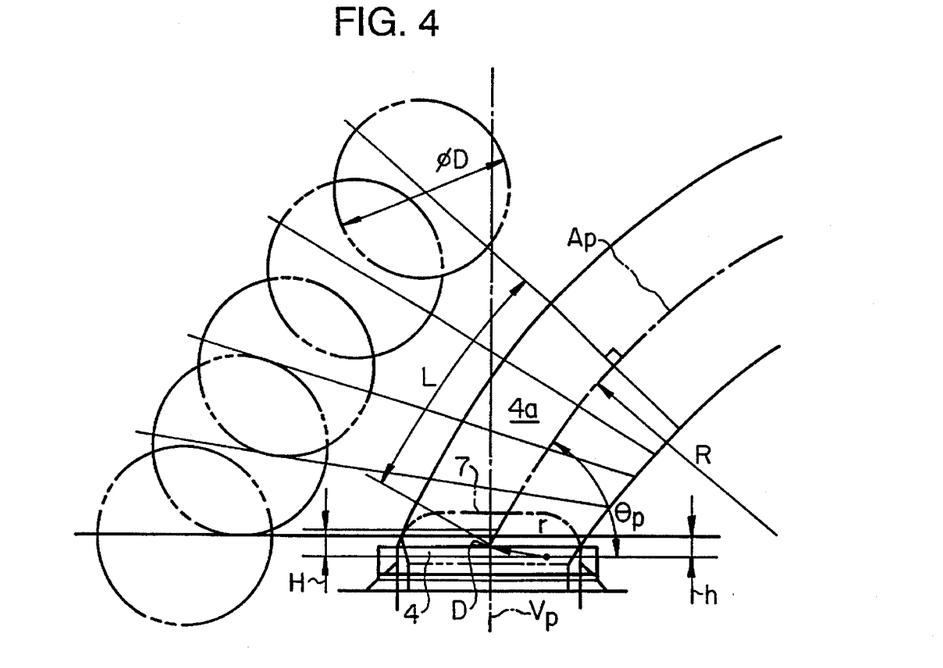
FIG. 4 is an illustration showing determination of the configuration of the intake port.
Figure 5:
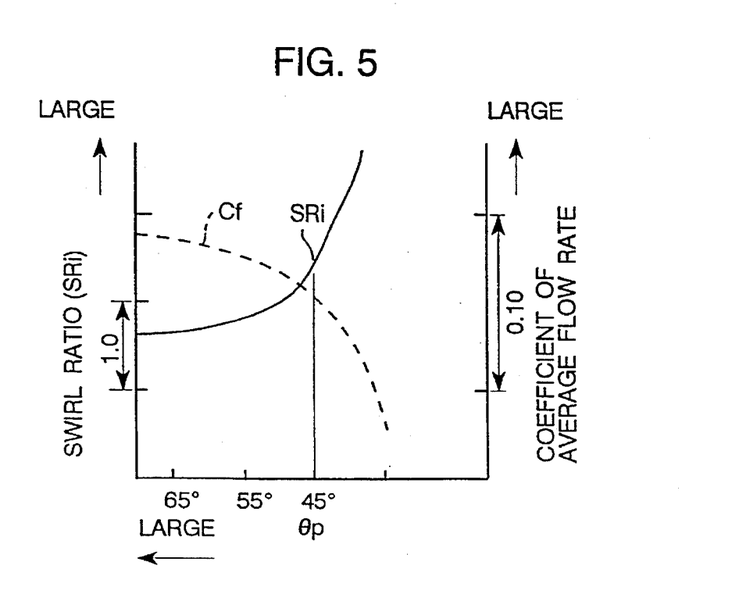
FIG. 5 is a diagram showing the characteristics of the intake port on swirl ratio and average flow rate.

The manner of determining the configuration of a curved throat portion 4a of the intake port 4 will be described with reference to FIG. 4. In this instance, the throat portion 4a includes a curved major upstream throat section, a transitional throat section curving with a small curvature r, and a downstream straight throat section. As was previously described, the major upstream throat section of the throat portion 4a may be straight. At first, a center line AP is defined so that the throat portion 4a meets the valve port 4b at a given directional angle θP which is the angle defined between a line which passes an intersection D of the extension of the curved center line AP of the curved upstream throat section and the axis VP of the intake valve 10 and is tangential to the curved center line AP of the curved upstream throat section and the plane in which the valve port 4b opens into the combustion chamber. In this instance, the throat portion 4a has a given length L which is measured from the intersection D of the extension of the curved center line AP of the curved upstream throat section and the axis VP of the intake valve 10. As shown in FIG. 5, which illustrates characteristic curves of the intake port for swirl ratio and the coefficient of average flow rate as functions of directional angles θP according to the results of experiments, in order for the intake port 4 to ensure effective swirl intensity, i.e. an appropriate range of swirl ratios SRi, and to keep resistance to intake air flow to a minimum, i.e. to prevent a large decline in the coefficient of average flow rate Cf, there is the lowest limit in the directional angle θP. In considering these fundamental factors, it is suitable for the directional angle θP to be larger than 45°. Thereafter, a curved transitional throat section B with a curvature r is defined so as to have its center Bc of curvature located within the valve port 4b. Specifically, the curvature r should be less than half of the diameter D of a cross-section of the throat portion 4a in the reference plane. Further, the throat portion 4a is defined so as to provide, for cross-sections in the respective reference planes between the upstream extremity of the throat portion 4a to the downstream extremity of the throat portion 4a, approximately the same configuration, such as a circle, and area. The length L of the throat portion 4a should be larger than the diameter D of the cross-section in the reference plane.

The open end of throat portion 4a, having the internal wall which gradually narrows downstream, and the valve opening 4b are finished simultaneously and coaxially with the axis VP of the intake valve 10 by use of the cutting tool 7. The point from which the internal wall of the throat portion 4a starts to get gradually narrow is above a standard plane passing the center Bc of curvature of the transitional throat section B with the curvature r and perpendicular to the axis VP of the intake valve 10. This point is also at a height h from the standard plane which is less than a height H from the standard plane at which the transitional point, from the curved transitional throat section B to the major upstream throat section of the throat portion 4a, is located.

The cutting tool 7 cuts the internal wall of the intake port 4 so as to both form a rounded concave shoulder a along a certain circumferential extent of the intake port 4a adjacent to the valve port 4b on the swirl side with respect to the center line AP of the intake port 4 and leave an edge b along a certain circumferential extent of the valve port 4b on another side opposite to the swirl side with respect to the center line AP of the intake port 4.

Figure 6A:
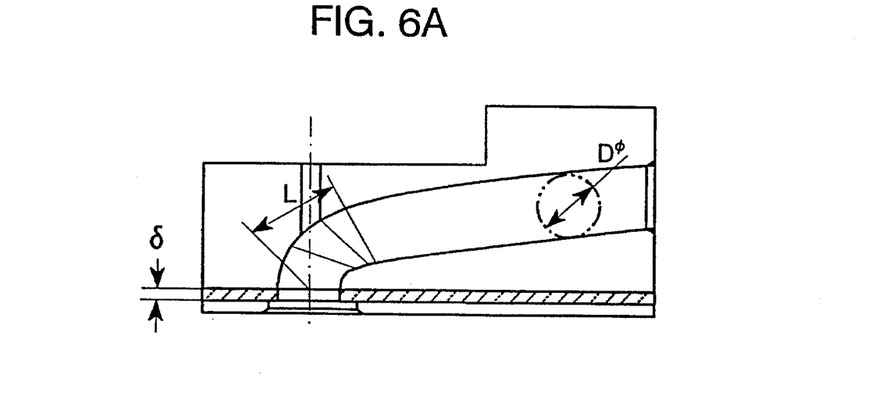
FIGS. 6(A)–6(C) are illustrations showing the results of an experiment on the effect of deviation of a port core on swirl ratio and average flow rate.
Figure 6B:
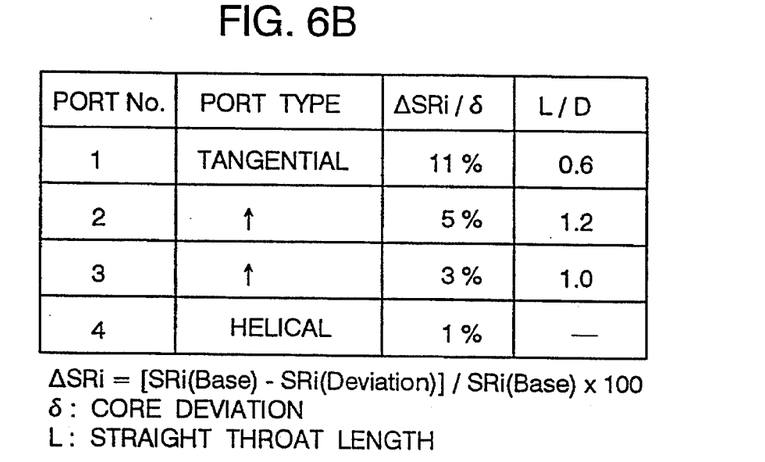
Figure 6C:
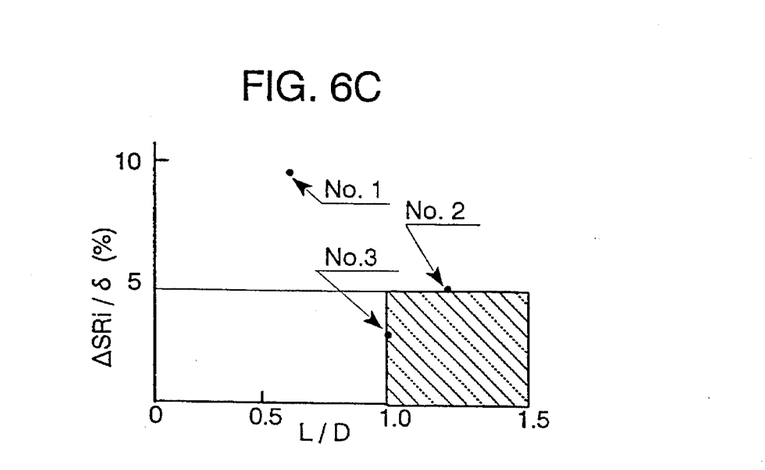

FIGS. 6(A)–6(C) illustrate the results of an experiment on the effect of deviation of a port core on swirl ratio. A deviation δ of the core for the outlet end of intake port in the pattern shown in FIG. 6(A) has direct effects upon changes in swirl ratio as shown in FIG. 6(B). The deviation of the core affects a change in swirl ratio of a tangential straight port more than that of a helical straight port. There is a close relationship between the length of a throat portion and the deviation of a core. When the straight throat portion of an intake port has a length sufficient to rectify intake air flow, the change in swirl ratio is suppressed. Specifically, as shown in FIG. 6(C), when the length of a straight throat portion L is longer than the diameter D of the intake port, the change in swirl ratio per 1 (one) mm is suppressed so that it is less than 5%. In mass production of cylinder heads, it is easy to control the deviation of a core so that it stays within 1 (one) mm. Control of the characteristics of a tangential port is satisfactorily effected.

It is to be understood that, although the present invention has been described with regard to a cylinder head for a diesel engine having two intake ports per cylinder, it is applicable to cylinder heads having both a single intake port and a plurality of intake ports per cylinder. The invention is also applicable to cylinder heads having a single intake port or a plurality of intake ports per cylinder for gasoline engines. Further, various other embodiments and variants may occur to those skilled in the art which are within the scope and spirit of the invention. Such other embodiments and variants are intended to be covered by the following claims.

What is claimed is:

1. An intake port structure for a cylinder head, in which an intake port is directed so as to introduce intake air flow into a combustion chamber in a desired direction through a valve port at an end thereof, comprising a throat portion, extending upstream from said valve port, which is configured (1) so that a line, tangential to a center line of said throat portion at an intersection point between an extension of said center line of said throat portion and a center line of said valve port perpendicular to a plane in which said valve port opens into said combustion chamber, intersects said plane at a given angle and (2) so as to have approximately the same cross-sectional area in reference planes gradually shifted between an upper reference plane, perpendicular to said center line of said throat portion at a given distance from said intersection point, and a bottom reference plane, perpendicular to said center line of said valve port;

the throat portion, between said intersection point and a point at said given distance upstream from the intersection, having reference cross-sections with a substantially fixed cross-sectional area between an upstream end of the throat portion and a downstream end of the throat portion;

the reference cross-sections, at the upstream end of the throat portion, being perpendicular to the center line of the throat portion and, at the downstream end of the throat portion, being perpendicular to the center line of the valve port;

intersecting angles at which the reference cross-sections intersect the center line of the throat portion gradually increasing from the upstream end to the downstream end of the throat portion; and a cross-section of the throat portion, intersecting the center line of the valve port at 90° gradually decreasing from an upstream end to a downstream end.

2. An intake port structure as defined in claim 1, wherein said intake port includes a transitional throat portion in close proximity to said intersection point, said transitional throat portion curving with a radius which is sufficiently small so as to have no effect on directivity of intake air flow.

3. An intake port structure for a cylinder head having at least two intake ports, one of said intake ports having a throat portion, extending upstream from a first valve port at an end thereof, which has a center line extending straight toward a combustion chamber and directed tangentially to a cylinder in a plane approximately perpendicular to a vertical center line of said first valve port so as to produce a swirl in said combustion chamber and another of said intake ports having a throat portion, extending upstream from a second valve port at an end thereof, which has a center line extending straight toward the combustion chamber and directed toward a vertical center line of said second valve port so as to produce a tumbling flow in a plane approximately parallel to said vertical center line of said second valve port, the throat portion of the one intake port extending upstream from said first valve port;

the one intake port comprising a transitional throat portion, extending between said throat portion and said first valve port, which curves with a radius which is sufficiently small so as to have no effect on directivity of intake air flow;

said throat portion of the one intake port being configured so that a line, tangential to a center line of said throat portion of said one intake port at an intersection point between an extension of said center line of said throat portion of said one intake port and the center line of said first valve port perpendicular to a plane in which said first valve port opens into said combustion chamber, intersects said plane at a given angle and so as to have approximately the same cross-sectional areas in reference planes gradually shifted between an upper reference plane, perpendicular to said center line of said throat portion of the one intake port at a given distance from said intersection point, and a bottom reference plane, perpendicular to said center line of said first valve port the throat portion of the one intake port, between said intersection point and a point at said given distance upstream from the intersection, having reference cross-sections with a substantially fixed cross-sectional area between an upstream end of the throat portion and a downstream end of the throat portion;

the reference cross-sections, at the upstream end of the throat portion of the one intake port, being perpendicular to the center line of the throat portion and, at the downstream end of the throat portion, being perpendicular to the center line of the valve port;

intersecting angles at which the reference cross-sections intersect the center line of the throat portion of the one intake port gradually increasing from the upstream end to the downstream end of the throat portion; and a cross-section of the throat portion of the one intake port, intersecting the center line of the valve port at 90°, gradually decreasing from an upstream end to a downstream end.

4. An intake port structure as defined in claim 2, wherein said one intake port has an internal wall adjacent to said first valve port cut coaxially with said center line of said first valve port to a height so as to form a rounded concave shoulder along a predetermined circumferential extent on one side at which said one intake port produces a swirl in said combustion chamber with respect to said center line of said first valve port and to remove a predetermined finishing allowance necessary to leave an edge along a predetermined circumferential extent on another side opposite to said one side with respect to said center line of said first valve port.

5. An intake port structure as defined in claim 2, wherein said transitional throat portion has a center of curvature within said intake port.

6. An intake port structure as defined in claim 2, wherein said throat portion has a circular cross-section in each of said reference planes and said radius of said transitional throat portion is less than half a diameter of said circular cross-section.

7. An intake port structure as defined in claim 2, wherein said center line of said throat portion is approximately straight.

8. An intake port structure as defined in claim 2, wherein said throat portion has a circular cross-section in each of said reference planes and has said center line curved with a curvature more than three times as long as a diameter of said circular cross-section.

9. An intake port structure as defined in claim 2, wherein said throat portion has a circular cross-section in each reference plane and said given distance is larger than a diameter of said circular cross-section.

10. An intake port structure as defined in claim 2, wherein said throat portion has an internal wall which gets narrow gradually downstream starting from a specific point above a standard plane in which a center of curvature of said transitional throat portion is positioned and which is perpendicular to said center line of said valve port and below a transitional point from said transitional throat portion to said throat portion.

11. A method of establishing an intake port structure for a cylinder head in which a center line of an intake port is determined so that said intake port directs intake air flow in a predetermined direction in a plane perpendicular to a vertical center line of a valve port leading to a combustion chamber, said method comprising the steps of:

defining a center line of a throat portion of said intake port near the valve port so that a line tangential to said center line of said throat portion, at an intersection point between an extension of said center line of said throat portion and the center line of said valve port, perpendicular to a plane in which said valve port opens into said combustion chamber, intersects said plane at a given angle; and defining cross-sections in reference planes gradually shifted between an upper reference plane, perpendicular to said center line of said throat portion at a given distance from said intersection point, and a bottom reference plane perpendicular to said center line of said valve port at said intersection point so as to have approximately the same configuration and area;

providing the throat portion, between said intersection point and a point at said given distance upstream from the intersection, with reference cross-sections having a substantially fixed cross-sectional area between an upstream end of the throat portion and a downstream end of the throat portion;

forming the reference cross-sections, at the upstream end of the throat portion, perpendicular to the center line of the throat portion and, at the downstream end of the throat portion, perpendicular to the center line of the valve port;

defining intersecting angles at which the reference cross-sections intersect the center line of the throat portion which gradually increase from the upstream end to the downstream end of the throat portion; and defining a cross-section of the throat portion, intersecting the center line of the valve port at 90°, so that it gradually decreases from an upstream end to a downstream end.

12. A method as defined in claim 11, wherein said method includes defining a transitional throat portion curving with a radius sufficiently small as to have no effect on directivity of intake air flow in close proximity to said intersection point.

13. A method as defined in claim 12, wherein an internal wall of said intake port adjacent to said valve port is determined such that, said internal wall is cut coaxially with said center line of said valve port by a cutting tool with an upper edge chamfered and rounded with a predetermined curvature to a predetermined height, said internal wall is formed with a rounded shoulder along a predetermined circumferential extent on one side with respect to said center line of said valve port and an edge left along a predetermined circumferential extent on another side opposite to said one side with respect to said center line of said valve port as a result of removal of a predetermined finishing allowance.

14. A method as defined in claim 12, wherein said radius of said transitional throat portion is determined so as to place a center of curvature of the transitional throat portion within said intake port.

15. A method as defined in claim 12, wherein said throat portion is determined so as to have a circular cross-section in each reference plane and curvature of said transitional throat portion is less than half a diameter of said circular cross-section.

16. A method as defined in claim 12, wherein said throat portion is determined so as to have an approximately straight center line.

17. A method as defined in claim 12, wherein said throat portion is determined so as to have a circular cross-section in each reference plane and has said center line curved with a curvature more than three times as long as a diameter of said circular cross-section.

18. A method as defined in claim 12, wherein said throat portion is determined so as to have a circular cross-section in each reference plane and said given distance is larger than a diameter of said circular cross-section.

19. A method as defined in claim 12, wherein said throat portion is determined so as to have an internal wall which gets narrow gradually downstream starting from a specific point above a standard plane in which a center of curvature of said transitional throat portion is positioned and which is perpendicular to said center line of said valve port and below a transitional point from said transitional throat portion to said throat portion.

* * * * *